US012673387B2

(12) United States Patent
Stäubli et al.

(10) Patent No.: US 12,673,387 B2
(45) Date of Patent: Jul. 7, 2026

(54) METHOD FOR WELDING SHEET METAL PARTS

(71) Applicant: ANDRITZ Soutec AG, Neftenbach (CH)

(72) Inventors: Daniel Stäubli, Wettingen (CH);
Michael Kronthaler, Bachenbülach (CH)

(73) Assignee: ANDRITZ Soutec AG, Neftenbach (CH)

( * ) Notice: Subject to any disclaimer, the term of this patent is extended or adjusted under 35 U.S.C. 154(b) by 718 days.

(21) Appl. No.: 18/245,747

(22) PCT Filed: Aug. 16, 2021

(86) PCT No.: PCT/EP2021/072748
§ 371 (c)(1),
(2) Date: Mar. 17, 2023

(87) PCT Pub. No.: WO2022/069105
PCT Pub. Date: Apr. 7, 2022

(65) Prior Publication Data
US 2023/0356328 A1 Nov. 9, 2023

(30) Foreign Application Priority Data

Oct. 1, 2020 (AT) .............................. A 50842/2020

(51) Int. Cl.
*B23K 26/24* (2014.01)
*B23K 26/03* (2006.01)
(Continued)

(52) U.S. Cl.
CPC ............ *B23K 26/24* (2013.01); *B23K 26/032* (2013.01); *B23K 26/0838* (2013.01); *B23K 2101/185* (2018.08)

(58) Field of Classification Search
CPC .............................. B23K 26/24; B23K 26/032
See application file for complete search history.

(56) References Cited

U.S. PATENT DOCUMENTS

| | | | |
|---|---|---|---|
| 5,328,083 | A | 7/1994 | Peru et al. |
| 6,034,347 | A | 3/2000 | Alber et al. |

(Continued)

FOREIGN PATENT DOCUMENTS

| | | |
|---|---|---|
| CN | 203124961 U | 8/2013 |
| DE | 10113471 A1 | 10/2002 |

(Continued)

OTHER PUBLICATIONS

Nilsen, Morgan et al., "Adaptive control of the filler wire rate during laser beam welding of squared butt joints with varying gap width," International Journal of Advanced Manufacturing Technology, vol. 192, No. 9, p. 3667-3676, Feb. 21, 2019.

(Continued)

*Primary Examiner* — Helena Kosanovic
*Assistant Examiner* — John S Hunter, Jr.
(74) *Attorney, Agent, or Firm* — Alix, Yale & Ristas, LLP

(57) ABSTRACT

A method for butt welding of flat metal blanks in a welding machine, where two metal blanks are placed on a conveyor unit by feed devices and secured. Two edges of two metal blanks to be welded together are placed together to form a butt joint with the smallest possible gap and then welded together using a welding laser. The gap width is measured and controlled using the measured values from the welding process. The gap width is measured using a reflected-light method and the true gap width via the transmitted light method in such a way that the missing area and the missing volume in the gap can be estimated accurately.

20 Claims, 7 Drawing Sheets

(51) Int. Cl.
*B23K 26/08* (2014.01)
*B23K 101/18* (2006.01)

(56) References Cited

U.S. PATENT DOCUMENTS

| | | | |
|---|---|---|---|
| 6,087,619 A | 7/2000 | Berkmanns et al. | |
| 11,389,891 B2 | 7/2022 | Kronthaler et al. | |

FOREIGN PATENT DOCUMENTS

| | | | | |
|---|---|---|---|---|
| JP | S60108189 A | * | 6/1985 | |
| WO | 2014026297 A1 | | 2/2014 | |

OTHER PUBLICATIONS

International Search Report mailed Jan. 19, 2022 for International Patent Application No. PCT/EP2021/072748.

* cited by examiner

METHOD FOR WELDING SHEET METAL PARTS

BACKGROUND

The disclosed embodiments relate to a process for butt welding of sheet metal parts, particularly but not exclusively in car body making.

In order to produce sheet metal parts in car body making, modern manufacturing methods are used that make welded parts, so-called tailored blanks (TWB), out of individual metal sheets—after preparing the edges if need be. In known welding processes, particularly in laser welding, metal sheets are fed to a stationary welding tool and welded. Nowadays, manufacturers mainly make use of the advantage that blanks can be made up of different material grades or sheet thicknesses. This makes it possible to adapt various parts of the subsequent component to the component loads occurring locally in the future, which would otherwise require additional reinforcing parts. In the car industry nowadays, door rings are made of TWB. Such door rings comprise up to eight individual parts, the gap formation being different due to the shape and manufacturing tolerances between these individual parts and also the sheet thicknesses of the individual parts being different. Furthermore, the fact that the gap situation can differ from door ring to door ring, where different types of gap situation can occur, makes efficient production more complicated. Proficiency with V-shaped welds is the biggest challenge here.

Poor welding quality means that undesirable cracks can occur in the weld seams during door ring crash tests. Due to safety considerations, this is not a risk that can be taken in the production of door rings because a crash under real circumstances would be fatal for the car industry and have correspondingly dramatic consequences. So far, methods are known for closing variable gaps up to a maximum of 0.3 mm by adding filler wire.

Depending on the welding task (materials of the components to be welded), it is a challenge to close variable gaps up to approximately 1 mm dynamically with filler metal (wire) and high welding quality.

There are two welding methods known, especially for laser welding: In a first method, metal sheets are positioned exactly, clamped in place and welded together by a movable welding head. In the other process, metal sheets are fed to a stationary welding tool and welded together. Both methods require a high degree of mechanical precision in order to process a maximum gap width that is currently in the region of 0.3 mm.

A method and a device for performing the process is described in patent specification U.S. Pat. No. 5,328,083, however it does not disclose how the welding tool is positioned exactly in relation to the current part of the seam. As a result, inaccuracies in the blanks and shifts in the position of the seam can lead to faulty welds.

In European patent specification EP 0817698 B1, a method is described for continuous butt-seam welding of metal sheets, where the relative position of the metal sheets and thus the precision of the groove is maintained within a specified tolerance range. This method deliberately does without mechanically precise alignment of the sheets to be welded together. Instead, the gap width and gap position are determined by means of sensor equipment and the laser tool follows the path of the two abutting metal sheets. Hereafter, a control loop can be used to permanently adjust the performance of the weld beam and the required cooling output for the welding process (gas, water). A system of this kind requires a great deal of maintenance.

Scenarios in which the gap situation can vary from component to component, where A-shaped, V-shaped, parallel and zero-gaps, or mixtures thereof occur, are challenging in laser welding. A well-known method of determining the gap measurements is the reflected-light method. With this method, a light source shines a light on the gap and this light is reflected by the metal surface and analysed by a camera disposed on the same side of the metal sheets as the light source. A well-known reflected-light method is laser line evaluation, for example. This method is based on laser triangulation. For this purpose, a laser line is projected onto the surface of the two metal blanks. The projected laser line is largely vertical to the edges of the metal sheet forming the gap. Depending on the distance and the gap shape, the reflected laser line hits a camera at a certain angle. The gap width can then be determined by evaluating the laser line filmed.

However, a system of this type cannot always provide the correct gap measurements. This measuring system can deliver incorrect gap measurements, especially if it is not possible to ensure that it is always the same side of the metal sheets facing upwards.

In particular, systems of this kind usually only provide the gap width in the upper area of the gap, but barely allow any conclusions as to the gap width in lower areas.

Large gap widths between the two metal sheets to be welded result in a loss of absorbed laser energy in the gap because part of the laser beam passes through the gap unhindered. It is possible to reduce this loss to a certain extent by defocusing the monofocus. However, this inevitably also reduces the maximum intensity of the laser beam.

On the other hand, the ability to weld with full penetration, i.e. complete penetration of the metal steam capillaries in laser welding, diminishes at a technical zero-gap. This can be compensated to a certain extent either by a reduced welding speed or else by increased laser power. In summary, it is true to say that an area of tension forms in the application between gap bridging capability and root penetration ability. In order to guarantee optimum productivity, the laser beam sources are operated at the design limit of the laser output. A change in the welding speed during welding work is not possible in many plant designs due to the reaction time. This leads generally to reduced productivity.

Several approaches have been investigated so far to solve the problems of processing, efficiency losses and process reliability of wide welding gaps. For example, the idea of a scan tracker with monofocus pursues the idea that a laser beam with a small focus diameter (0.2 mm to 0.3 mm) and high intensity oscillates at right angles across the welding assignment. The amplitude and the laser output is varied depending on the gap width measured. However, trials with the system technology available on the market for welding of blanks show that, due to the frequencies achievable, the period length of the oscillating motion does not guarantee full coverage of the remelted material at high welding speeds of approximately 10 m/minute. In order to generate acceptable weld seams, the welding speed would have to be reduced significantly, which would lead to a loss of productivity regardless of whether there is a gap or a zero-gap.

The twin-spot optics in laser welding, i.e. the use of two physically separated focuses on the workpiece, is a technique that has leapt in the meantime from the lab to the production line. Patent DE 101 13 471 B4 provides for the laser beam to have at least two points of focus in the weld point or at a short distance away from the weld point. Here, the spacing between the points of focus are varied constantly based on measurement of the individual parameters of the welding process, particularly the welding speed and the welding quality. Patent CN203124961 refers to laser processing devices and relates to a rotating twin-spot optics laser processing head, comprising a laser emitter, a light processing tube to convey laser beams, and a focusing mirror to focus the laser beams. A beam separator is connected to a drive device, which is able to rotate the beam separator.

A welding device with twin-spot optics is also described in EP 3 572 178 A1.

With twin-spot optics, distribution of the laser energy on both sides of a weld seam can be improved flexibly, thus avoiding the issue of insufficient individual focus energy transfer. Furthermore, the beam separator is connected to the drive and can be rotated accordingly. The double focus can be rotated by rotating the entire process optics or by rotating the twin-spot optics module. The major advantage of this process is that the distribution of output can be adapted to the task assigned and controlled, depending on the process conditions, e.g. if the gap widths have been changed. This achieves a high degree of flexibility and, above all, high process stability and weld quality. Nonetheless, investigations have shown that welding with the twin-spot optics technique at the same performance level provides less depth of penetration than welding with only one laser beam. From the manufacturing point of view, however, the question of the optimum parameters for producing the desired weld is very closely linked to the economic factors of the overall process. Hence, the efficiency of the process and the quality of the weld are the central characteristics of the joining process.

Important criteria in a process for welding tailored blanks are the throughput of the overall plant on the one hand, i.e. how many parts can be produced per hour at an acceptable reject rate, and on the other hand, the additional material required to ensure both the quality of the overall machining process as well as the desired quality of the welded blanks with reasonable technical effort and filler metal.

The disadvantage of the aforementioned solutions and methods is that only the gap width and gap position are normally measured, but the gap geometry are not taken into account. FIG. 3 shows different gap geometries in this respect, which are largely created by the cutting process. Even if the two metal blanks are touching at one point in the section plane and thus, there is a zero-gap here as a result, there are areas where the blanks do not touch. Ideally, the missing volume in these areas should be filled with material during the welding process in order to obtain the optimum welding result. For this purpose, however, it is necessary to determine or at least estimate not only the gap width at one point but also the gap geometry. This is not the case in known processes, where the gap width is only determined at one point, usually near the surface of the metal sheet.

SUMMARY

The disclosed embodiments are thus based on the task of eliminating the above-mentioned disadvantages.

Hence, as disclosed herein, the gap width is measured by means of a reflected-light method and the true gap width by means of a transmitted light method, and the missing area and missing volume in the gap are thus estimated more accurately. The true gap width is understood as being the minimum distance between the edges of the two metal sheets, i.e. the clear area between the blanks.

The reflected-light method is preferably a laser line method, hence a laser triangulation method in which a laser line is projected vertically to the path of the gap onto the surfaces of the metal sheet and the shape of the line is evaluated.

In the transmitted light method, the light shines through the gap and is measured on the metal sheet opposite by a camera. By evaluating the image accordingly, the clear width (true gap) between the two metal blanks can be determined.

Hence, the disclosed embodiments also make it possible to visualize and measure the true gap between blanks to be welded together in addition to measuring the gap width using the reflected-light method. As a result, the missing volume can be estimated and the welding process controlled to the optimum.

It is preferable to also add filler wire to the welding process. With the improved gap measuring device, the optimum requirement of filler metal (filler wire) can be determined more effectively, the optimum amount of wire can be fed in by controlling the feed speed of the additional wire, and the amount of filler wire needed can be reduced.

In this way, the overall production costs can be reduced by means of the method proposed.

All in all, the method proposed results in better productivity and a better process quality compared to other known methods.

The measuring results are preferably analysed using imaging techniques during the welding process in order to determine the missing volume between the two edges.

It is also useful if another light source and respective camera are used to detect holes in the weld produced.

The reflected-light method preferably uses light sources with monochromatic light.

It is favourable if the gap width and the true gap width are measured and evaluated continuously.

Even better results can be obtained if the reflected-light method is used to measure the gap width and, if necessary, also the transmitted light method is used to measure the true gap on the upper and lower sides of the metal blanks (1, 2).

The disclosed method is particularly suitable for producing tailored blanks in car body making.

BRIEF DESCRIPTION OF THE DRAWINGS

The present invention and also the problems of current measuring methods are explained further in the following using the embodiment examples and referring to drawings. In the drawings.

DETAILED DESCRIPTION

Figure 1:
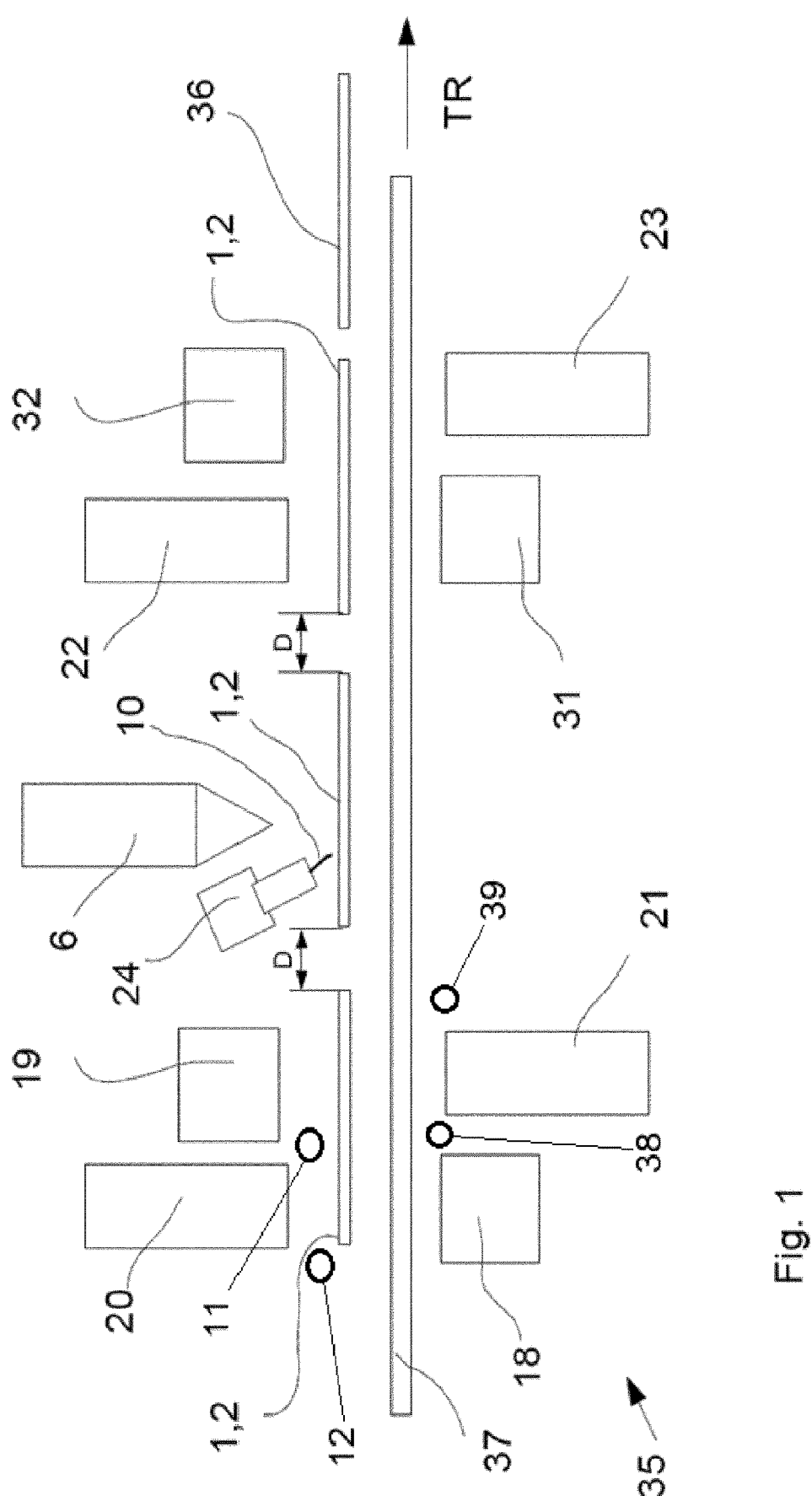
FIG. 1 shows an example of the disclosed laser welding process, in a side view as a schematic diagram.

The same reference numerals in the respective figures refer to the same characteristics in each case.

FIG. 1 shows an example of an embodiment of the laser welding process 35 according to the invention for processing metal blanks 1, 2, which are placed on a conveyor unit 37 that can be moved in transport direction TR. In a first process step, the metal blanks 1, 2 are placed on the conveyor unit 37 by means of feed devices (not shown) and held there by means of holding means (not shown). After this, the gap position and the gap width are determined. This is achieved with the help of the top camera 20, optionally also with the bottom camera 21. In addition, a bottom light 18 and a top light 19 are provided opposite each of the two cameras 20, 21.

The space D between the two metal blanks 1, 2 depends on the layout of the metal blanks to be welded, where D can be kept small if the metal blanks 1, 2 have a rectangular layout and can be selected to be larger if the metal blanks 1, 2 have a rhomboid layout. In a second process step, the metal blanks 1, 2 are joined to form a welded metal blank 36 by laser welding 6, with a filler wire 10 being added by the filler wire unit 24. In a third process step, the quality of the weld seam is checked from above with a stationary, second quality system comprising a top camera 22 and a bottom light 31 and, as an option, from below with an additional, stationary quality system (bottom camera 23 and top light 32). Subsequently, the welded metal blank 36 is removed from the conveyor belt after the holding means (not shown) has been detached.

Figure 2:
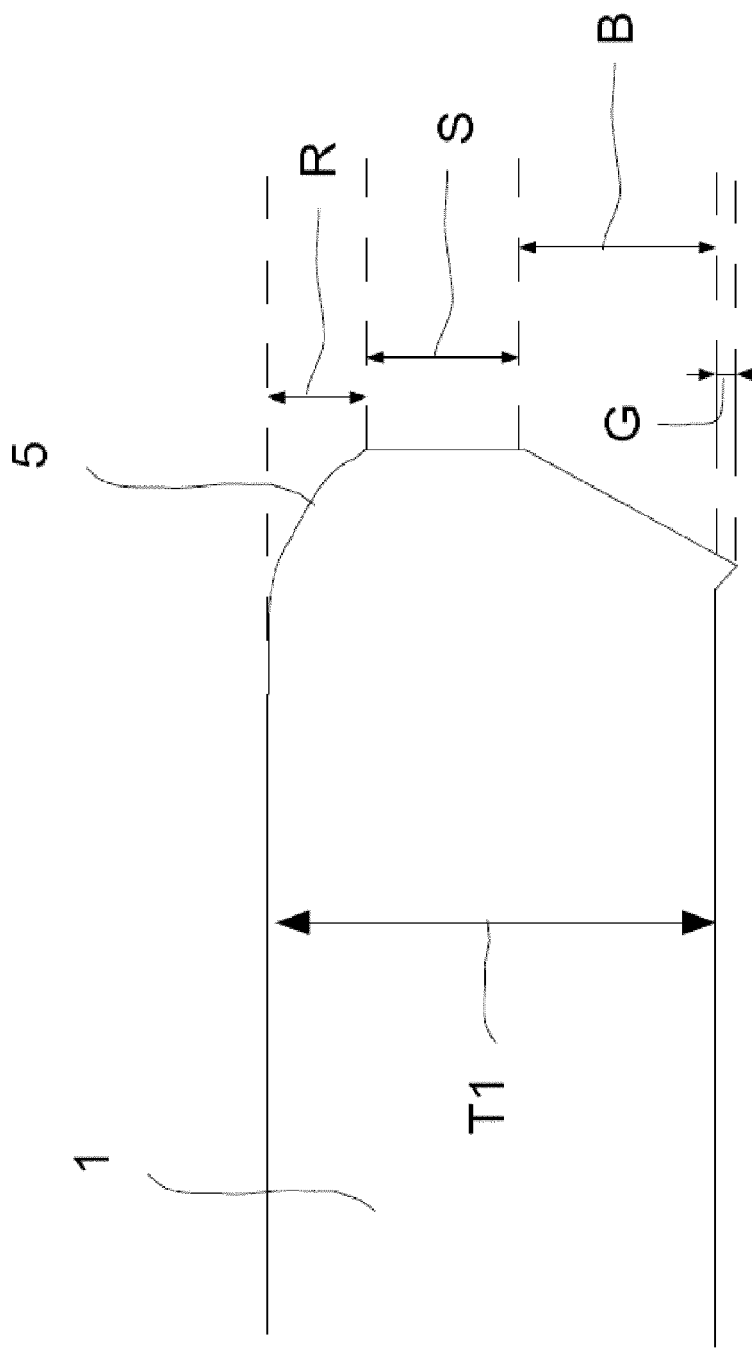
FIG. 2 shows the edge of a metal sheet in cross section after the cutting process.

FIG. 2 shows an example of the edge 5 of a metal blank 1 after cutting, with sheet thickness T1, as a schematic diagram. As a result of the cutting process, the edge 5 has the roll-over area R after plastic deformation, the non-deformed cutting area S, the fracture area B and the burr G. The ratio of S to B can vary considerably.

Figure 3:
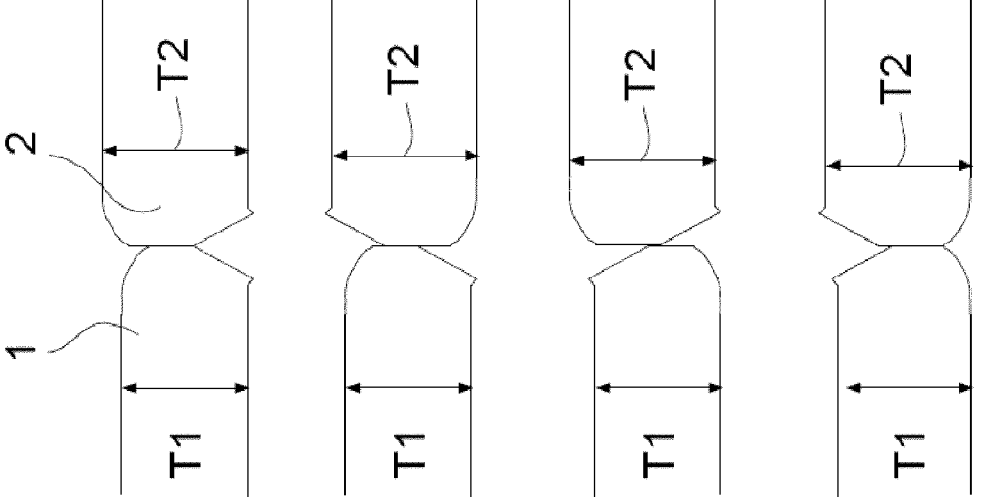
FIG. 3 shows possible shapes of cutting edges, in cross section as a schematic diagram.
Figure 3:
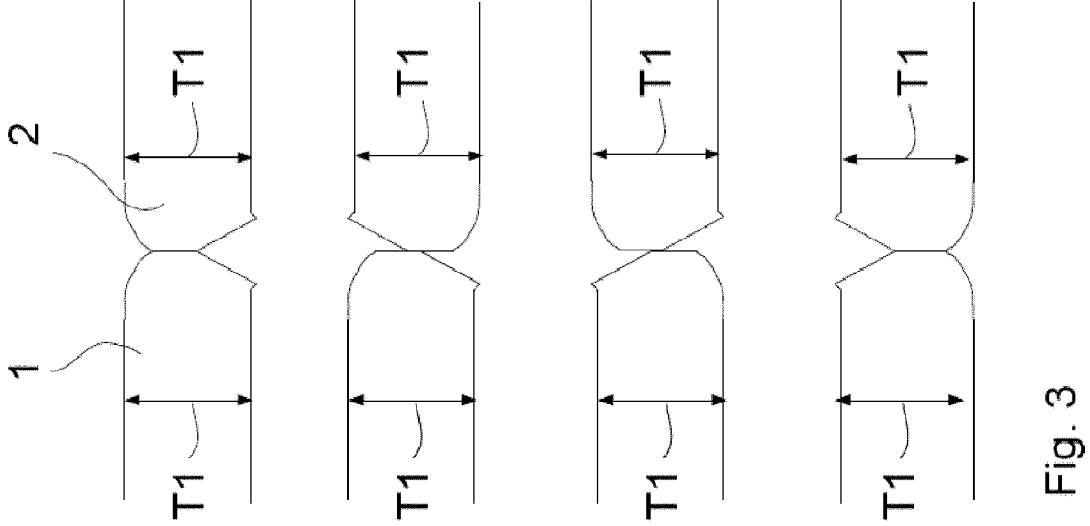

FIG. 3 shows possible cutting edge shapes and different gap geometries as a schematic diagram. If a left-hand metal blank 1 and a right-hand metal blank 2 are pushed against one another, the gap geometry between the two metal blanks 1, 2 can change from one blank to the next due to plastic deformation of the edges during the cutting process. In addition, the gap geometry depends upon whether the sheet thicknesses T1, T2 of the two metal blanks are the same or not. It is also clearly shown here that the gap geometry changes considerably depending on the position of the metal blanks 1, 2. If the two upper sides of the metal blanks 1, 2 in the cutting process also face upwards during the welding process, the gap geometry is completely different to when one or both of the sides facing upwards in the cutting process are facing downwards during the welding process.

Figure 4:
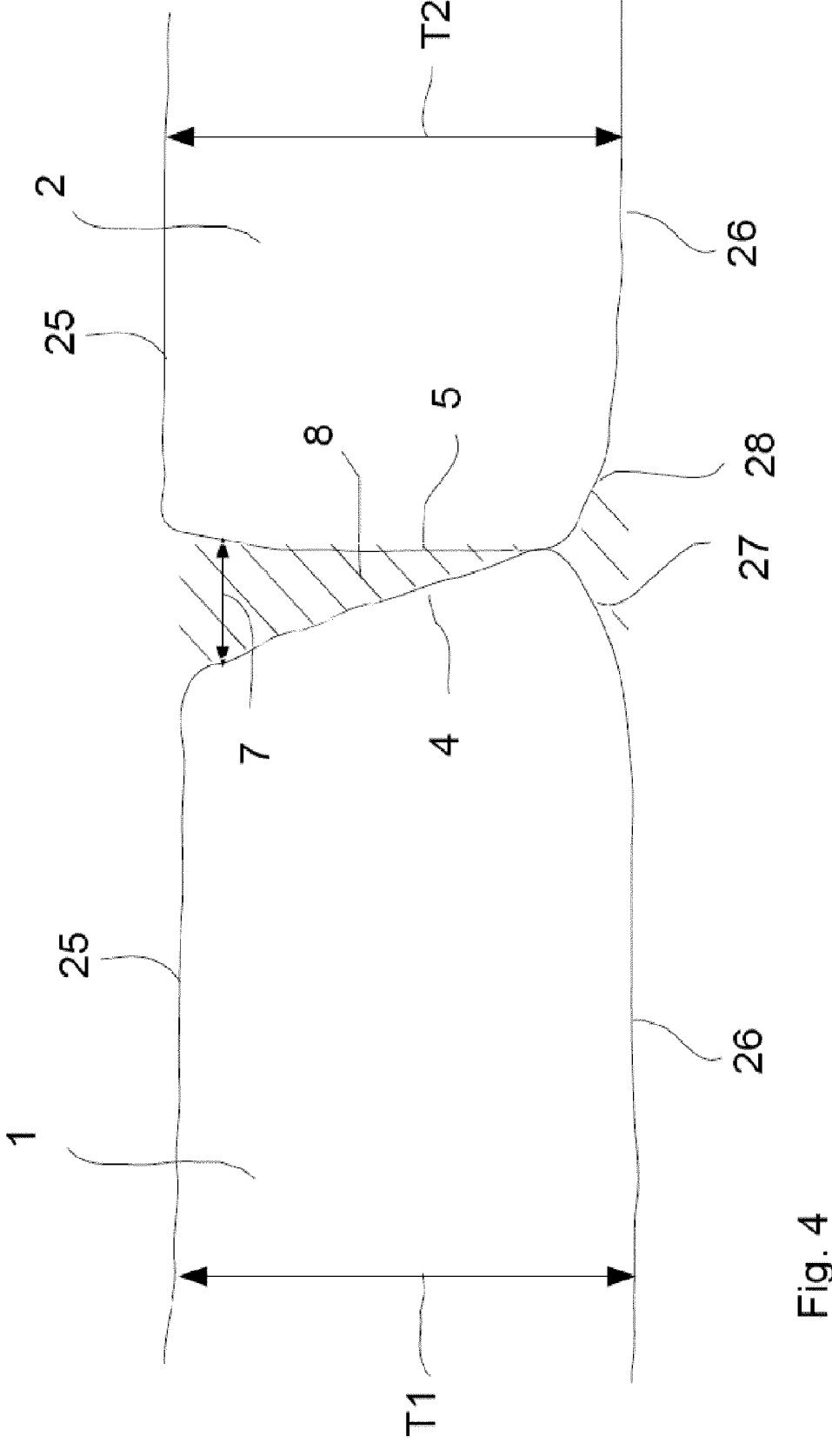
FIG. 4 shows the gap between two metal blanks that are touching each other (without true gap), in cross section as a schematic diagram.

FIG. 4 shows a schematic diagram with a left-hand metal blank 1 in cross section, with sheet thickness T1, with the upper side 25 and the lower side 26, and a right-hand metal blank 2 in cross section, with sheet thickness T2, with the upper side 25 and the lower side 26. The two metal blanks 1, 2 are touching at the bottom in the roll-over area on the left 27 and the roll-over area on the right 28. Thus, there is no gap (no true gap) in this area. The gap width 7 is determined with the gap measuring device using the reflected-light method according to the state of the art. This gap width 7 determined usually reflects the gap width in the upper part of the gap. The shaded area depicts the missing area 8 between the two metal blanks 1, 2. As the gap closes here in the lower area, the missing area 8 can only be estimated very roughly by means of the gap width 7 measured.

Figure 5:
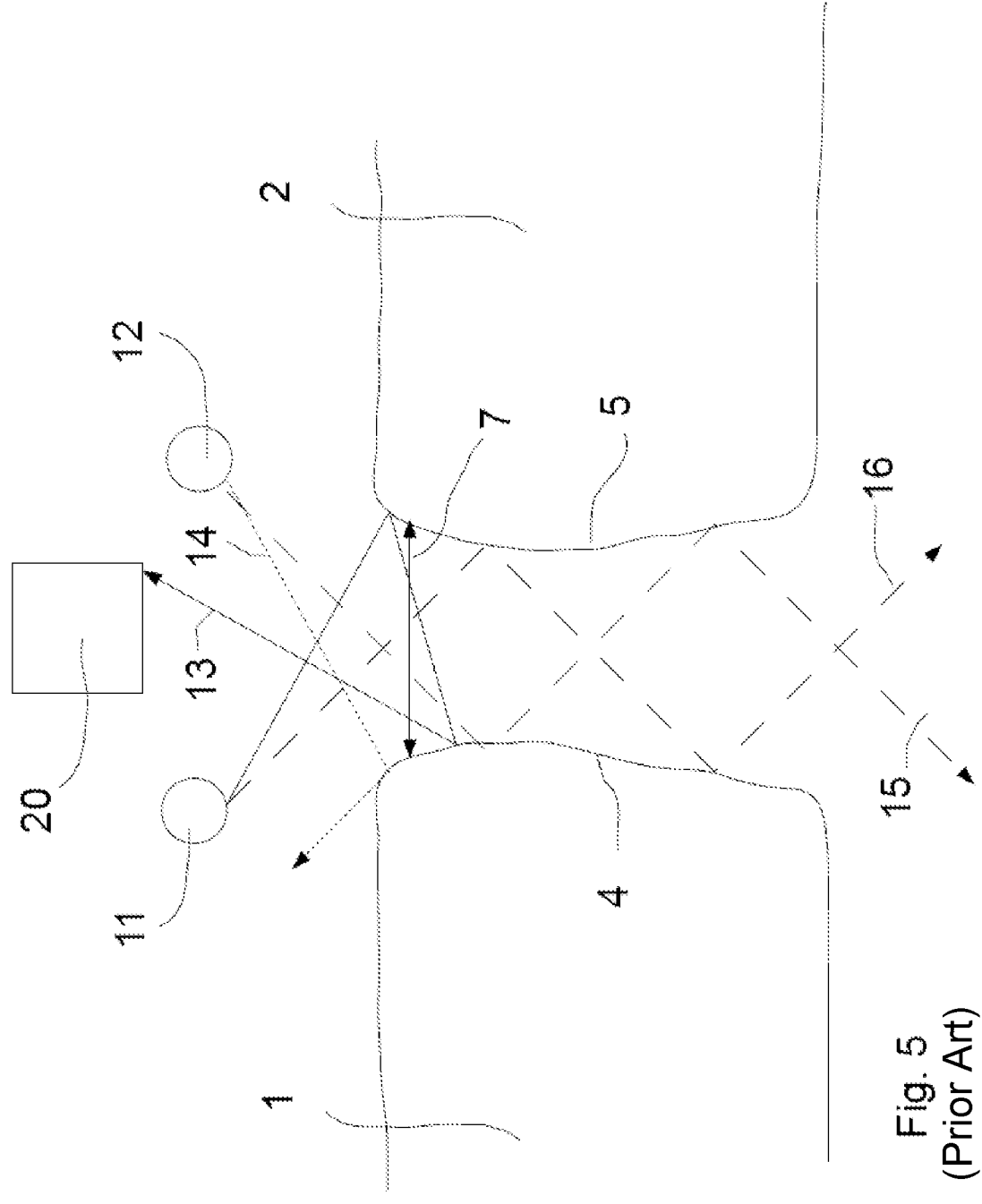
FIG. 5 shows a schematic diagram of two metal blanks in cross section that are not touching, with true gap and gap lighting according to the state of the art.

FIG. 5 shows a gap measuring device using the reflected-light method. The two metal blanks 1 and 2 are not touching here, hence there is a true gap. A true gap is understood as being the gap width equal to the minimum distance between the two edges 4 and 5 of the metal sheet when viewed in cross section. Two light sources 11, 12 illuminate the true gap, the light ray 13 reflected several times being received by the camera 20. The light ray 14 is reflected in the upper area of the left-hand edge 4 in such a way that it cannot be captured by the top camera 20. Light ray 15 and light ray 16 are reflected several times in the area of the left-hand edge 4 and the right-hand edge 5, but also cannot be captured by the camera 20. With this process, the gap width 7 is determined in the upper area of the metal blanks 1, 2, however, this generally is not the same as the true gap width.

Figure 6:
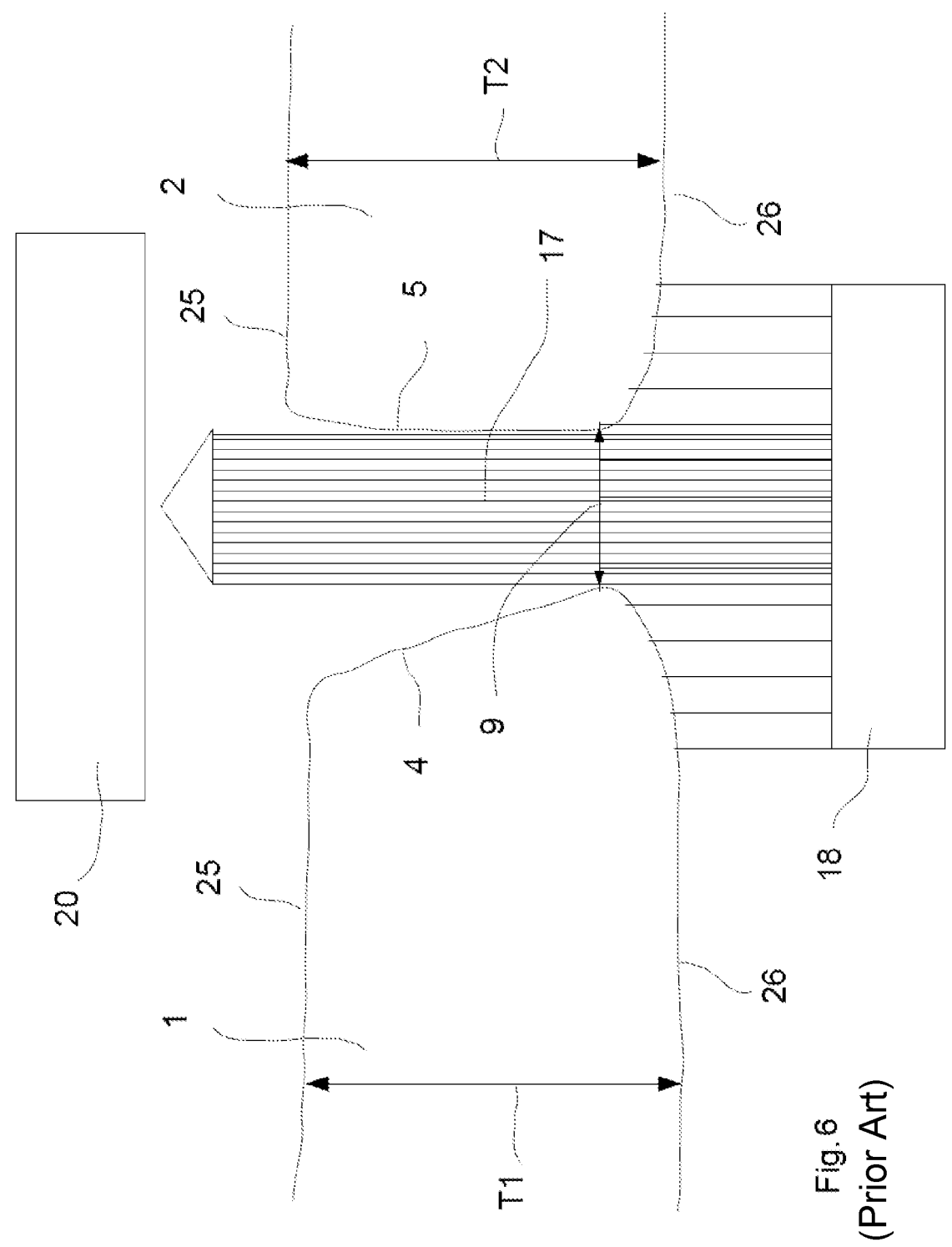
FIG. 6 in turn shows gap measurement by means of transmitted light, as a schematic diagram.

FIG. 6 now shows the gap measuring device using the transmitted light method at two metal blanks 1, 2 with true gap. Hence, the left-hand metal blank 1 with sheet thickness T1, with the upper side 25, the lower side 26, and the edge 4, and the right-hand metal blank 2 with sheet thickness T2, with the upper side 25, the lower side 26, and the edge 5, are not touching. The bottom light 18 shines light 17 from below through the gap, and this light is captured by the top camera 20. This gap measuring device using the transmitted light method measures the true gap width 9, which is the minimum distance between the two edges 4 and 5.

Figure 7:
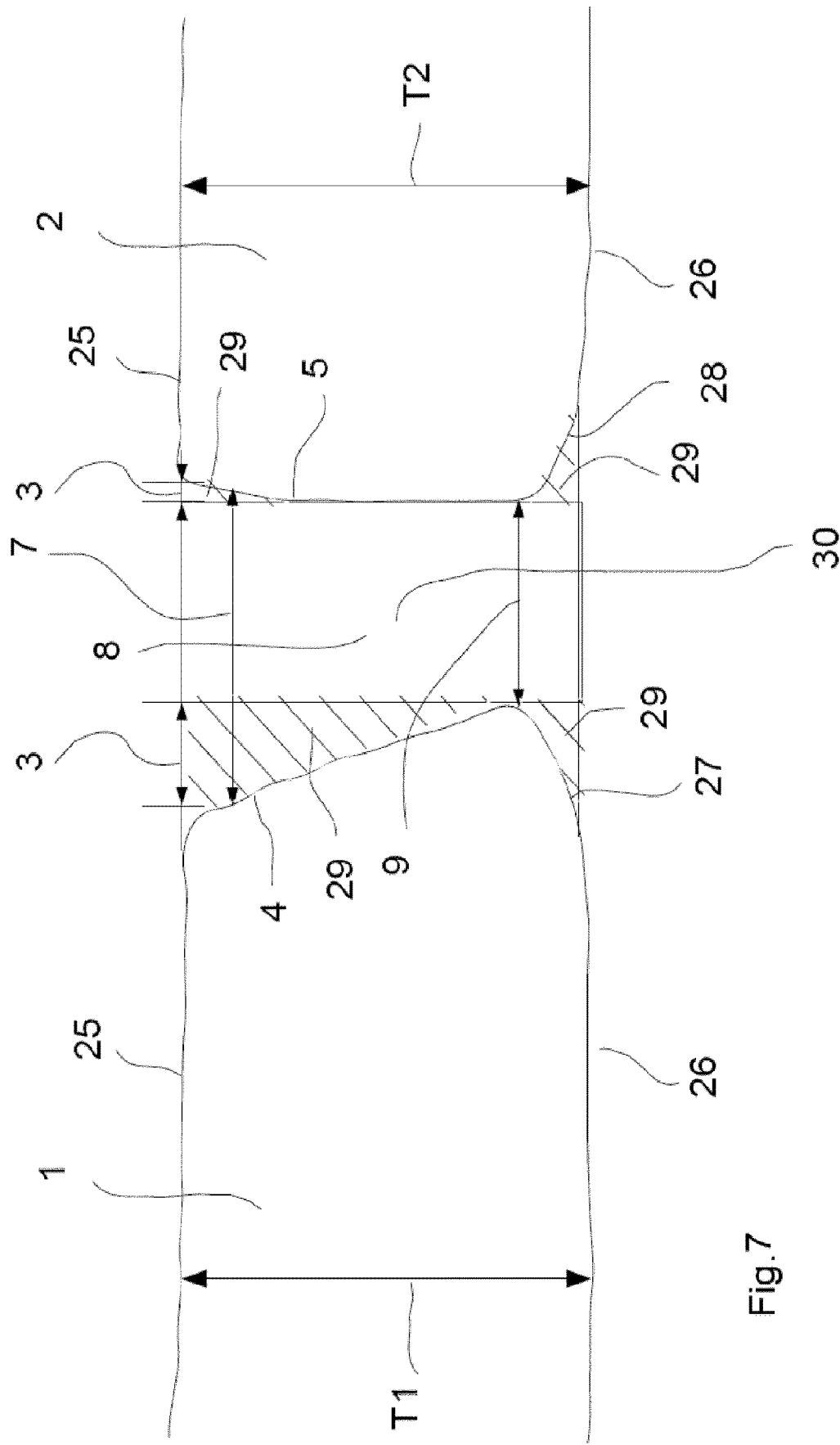
FIG. 7 shows the gap between two metal blanks that are not touching each other, in cross section as a schematic diagram.

FIG. 7 now shows the gap measuring device according to the disclosure. Here, the gap is measured using the reflected-light (as shown in FIG. 5) and the transmitted light method (as shown in FIG. 6) at the same time. The two metal blanks 1, 2 are not touching in the present example. The gap width 7 is measured in the upper area of the metal blanks 1 and 2 using the reflected-light method. The true gap width 9 is determined using the transmitted light method.

In the present example, the light rays from the reflected-light and the light rays from the transmitted light method are captured by a shared camera 20. If the true gap width 9 is deducted from the gap width measured 7, the false gap width 3 is obtained. The false gap area 29 is the gap area underneath the false gap width 3. The false gap area 29 can be estimated using the false gap width 3 and the sheet thickness T1, T2. The true gap area 30 can be determined using the true gap width 9 measured and the known sheet thicknesses T1, T2. The sum of the estimated false gap area 29 and the true gap area 30 determined adds up to the missing area 8 and can be used to estimate the missing volume.

In FIG. 1, the reflected-light method is used not only on the upper side of the metal blanks 1, 2 but also on the lower side. There are two light sources 38 and 39 located underneath the metal blanks for this purpose. The light rays from the light sources 38, 39 are reflected off the metal blanks and the gap and captured by the bottom camera 21. Similarly, this camera 21 captures the transmitted light rays from the top light.

LIST OF REFERENCE NUMERALS

1 Left-hand metal blank
2 Right-hand metal blank
3 False gap width
4 Sheet metal edge
5 Sheet metal edge
6 Welding laser
7 Gap width measured using the reflected-light method 8 Missing area
9 True gap width
10 Filler wire
11, 12 Light sources
13 Light ray
14 Light ray
15 Light ray
16 Light ray
17 Light
18 Bottom light
19 Top light
20 Top camera
21 Bottom camera
22 Top camera
23 Bottom camera
24 Filler wire unit
25 Upper side of metal blank
26 Lower side of metal blank
27 Roll-over, left
28 Roll-over, right
29 False gap area
30 True gap area
31 Bottom light
32 Top light
35 Laser welding process
36 Welded blank
37 Conveyor unit
38, 39 Light sources
TR Transport direction
R Roll-over area
S Cutting area
B Fracture area
G Burr
D Distance between metal sheets
T1 Sheet metal thickness, left-hand blank
T2 Sheet metal thickness, right-hand blank
The invention claimed is:

1. A method for butt welding of adjacent edges (4, 5) of flat metal blanks (1, 2) in a welding machine, comprising:
   providing two flat metal blanks (1, 2) to be welded together;
   placing the two metal blanks (1, 2) on a conveyor unit (37) and securing them in a respective position with a first edge (4) of one of the metal blanks (1, 2) and an adjacent second edge (5) of the other of the metal blanks (1, 2) having a smallest possible gap therebetween; and
   welding the adjacent first and second edges (4, 5) together using a welding laser (6) to form a butt joint, wherein
   a gap width (7) between the first edge (4) and second edge (5) is measured and controlled via measured values from the welding process,
   the gap width (7) is measured via a reflected-light method wherein light rays (13, 14, 15, 16) from one or more light sources (11, 12) are reflected between the first and second edges (4, 5) and at least one reflected light ray (13) is captured by a camera,
   a true gap width (9) equal to the minimum distance between the respective edges (4, 5) is measured simultaneously by a transmitted light method wherein light (17) from a light source (18) is transmitted through the gap from above or below and is captured by a camera (20) from below or above, respectively, and
   the gap width (7) measured via the reflected-light method and the true gap width (9) measured via the transmitted light method are used to estimate a missing area (8) or missing volume in the gap.

2. The method according to claim 1, wherein the reflected-light method is a laser line method.

3. The method according to claim 2, wherein the laser line method is a laser triangulation method.

4. The method according to claim 2, wherein the reflected-light method is used to measure the gap width (7) on an upper side and an opposite lower side of the metal blanks (1, 2).

5. The method according to claim 1, wherein filler wire (10) is fed to the laser welding process (35).

6. The method according to claim 5, wherein the filler wire feed is controlled according to the estimated missing volume.

7. The method according to claim 6, wherein the measured gap width (7) and true gap width (9) results are analyzed using imaging techniques during the welding process in order to estimate the missing volume between the two edges (4, 5).

8. The method according to claim 6, wherein one or more holes in a weld of the butt joint are detected after the welding process via a light (31, 31) and corresponding camera (22, 23).

9. The method according to claim 6, wherein the gap width (7) and the true gap width (9) are measured and analysed continuously throughout the welding process.

10. The method according to claim 6, wherein the transmitted light method is used to measure the true gap width (9) on an upper side and an opposite lower side of the metal blanks (1, 2).

11. The method according to claim 1, wherein the measured gap width (7) and true gap width (9) results are analyzed using imaging techniques during the welding process in order to estimate the missing volume between the two edges (4, 5).

12. The method according to claim 11, wherein one or more holes in a weld of the butt joint are detected after the welding process via a light (31, 31) and corresponding camera (22, 23).

13. The method according to claim 11, wherein the gap width (7) and the true gap width (9) are measured and analysed continuously throughout the welding process.

14. The method according to claim 1, wherein one or more holes in a weld of the butt joint are detected after the welding process via a light (31, 31) and corresponding camera (22, 23).

15. The method according to claim 1, wherein the reflected-light method uses light sources (11, 12) for monochromatic light.

16. The method according to claim 1, wherein the gap width (7) and the true gap width (9) are measured and analysed continuously throughout the welding process.

17. The method according to claim 1, characterized in that the reflected-light method and transmitted light method utilize at least one shared camera (20).

18. The method according to claim 1, wherein the reflected-light method is used to measure the gap width (7) on an upper side and an opposite lower side of the metal blanks (1, 2).

19. The method according to claim 1, wherein the transmitted light method is used to measure the true gap width (9) on an upper side and an opposite lower side of the metal blanks (1, 2).

20. The method of claim 1, wherein the flat metal blanks are utilized to produce tailored blanks for manufacturing a car body.

* * * * *